(12) United States Patent
Siercks et al.

(10) Patent No.: US 9,127,929 B2
(45) Date of Patent: Sep. 8, 2015

(54) METHOD AND MEASURING DEVICE FOR GAUGING SURFACES

(75) Inventors: Knut Siercks, Moerschwil (CH); Thomas Jensen, Rorschach (CH); Klaus Schneider, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 617 days.

(21) Appl. No.: 12/675,191

(22) PCT Filed: Aug. 22, 2008

(86) PCT No.: PCT/EP2008/006912
§ 371 (c)(1),
(2), (4) Date: Feb. 25, 2010

(87) PCT Pub. No.: WO2009/036861
PCT Pub. Date: Mar. 26, 2009

(65) Prior Publication Data
US 2010/0312524 A1 Dec. 9, 2010

(30) Foreign Application Priority Data
Sep. 14, 2007 (EP) .................................... 07116509

(51) Int. Cl.
*G01B 11/02* (2006.01)
*G01B 11/00* (2006.01)

(52) U.S. Cl.
CPC ..................................... *G01B 11/005* (2013.01)

(58) Field of Classification Search
USPC .......................... 356/482, 498, 511, 485, 486
See application file for complete search history.

(56) References Cited

U.S. PATENT DOCUMENTS

| 4,627,731 A | 12/1986 | Waters et al. |
| 4,643,577 A | 2/1987 | Roth et al. |

(Continued)

FOREIGN PATENT DOCUMENTS

| DE | 3322714 A1 | 1/1985 |
| DE | 4325337 A1 | 2/1994 |

(Continued)

OTHER PUBLICATIONS

R. Huber, et al, "Fourier Domain Mode Locking (FDML): A new laser operating regime and applications for optical coherence tomography" Optics Express, vol. 14, No. 8, Apr. 17, 2006 pp. 3225-3237.

(Continued)

*Primary Examiner* — Jonathan Hansen
(74) *Attorney, Agent, or Firm* — Maschoff Brennan

(57) ABSTRACT

In a method for gauging surfaces (7"), in which a frequency-modulated laser beam is generated, the laser beam is emitted onto the surface as measuring radiation (MS), the measuring radiation (MS) backscattered from the surface (7") is received and the distance between a reference point and the surface (7") is measured interferometrically, wherein the measuring radiation (MS) is emitted and received while the surface to be gauged is being scanned, and a measuring arm and a reference interferometer arm with a partially common beam path are used, deviations from the essentially perpendicular impingement of the measuring radiation (MS) on the surface (7") are taken into account algorithmically during distance measurement and/or are avoided or reduced during scanning by controlling the emission of the measuring radiation (MS).

24 Claims, 6 Drawing Sheets

(56) References Cited

U.S. PATENT DOCUMENTS

| | | | |
|---|---|---|---|
| 4,824,251 A * | 4/1989 | Slotwinski et al. | 356/477 |
| 4,839,526 A | 6/1989 | Pryor | |
| 5,198,874 A * | 3/1993 | Bell et al. | 356/500 |
| 5,402,582 A | 4/1995 | Raab | |
| 5,650,853 A | 7/1997 | Honda et al. | |
| 5,982,491 A | 11/1999 | Breyer et al. | |
| 6,008,901 A * | 12/1999 | Ohtsuka | 356/489 |
| 6,135,574 A | 10/2000 | Pettit et al. | |
| 6,137,574 A | 10/2000 | Hill | |
| 6,552,807 B1 | 4/2003 | Mitsutani et al. | |
| 6,790,175 B1 | 9/2004 | Furusawa et al. | |
| 7,969,578 B2 * | 6/2011 | Yun et al. | 356/497 |
| 2002/0085208 A1 | 7/2002 | Hauger et al. | |
| 2003/0048454 A1 | 3/2003 | Prinzhausen et al. | |
| 2006/0290942 A1 * | 12/2006 | Henselmans et al. | 356/498 |
| 2007/0257216 A1 * | 11/2007 | Withers et al. | 250/580 |

FOREIGN PATENT DOCUMENTS

| | | |
|---|---|---|
| DE | 4325347 A1 | 2/1994 |
| DE | 19654067 A1 | 4/1998 |
| DE | 102005026022 A1 | 12/2005 |
| EP | 0 837 300 B1 | 7/2003 |
| EP | 1474650 A2 | 11/2004 |
| EP | 1744119 A1 | 1/2007 |
| JP | 63-255685 A | 10/1988 |
| JP | 01-119735 A | 5/1989 |
| JP | 02-259510 A | 10/1990 |
| JP | 3116830 A | 5/1991 |
| JP | 05005610 A | 1/1993 |
| JP | 08-110204 A | 4/1996 |
| JP | 08-114434 A | 5/1996 |
| JP | 2000-131032 A | 5/2000 |
| JP | 2000-321034 | 11/2000 |
| JP | 2001-108417 A | 4/2001 |
| JP | 2001-125009 A | 5/2001 |
| JP | 2001-296104 | 10/2001 |
| JP | 2002-156206 A | 5/2002 |
| JP | 2003-529753 A | 10/2003 |
| JP | 2004-309402 A | 11/2004 |
| JP | 2005-283155 A | 10/2005 |
| JP | 2007-024677 A | 2/2007 |
| JP | 2007-033217 A | 2/2007 |
| JP | 2007-209536 A | 8/2007 |
| WO | 92/19930 | 11/1992 |
| WO | 99/53271 | 10/1999 |
| WO | 02/40936 A1 | 5/2002 |

OTHER PUBLICATIONS

Japanese Office Action dated Sep. 22, 2011 as received in related application No. JP 2010-524372.
Office Action dated Mar. 1, 2012 as received in Canadian Patent Application No. 2,698,961.
Japanese Office Action issued Nov. 2, 2012 in related JP Patent Application No. 2010-524372.
Office Action dated Jan. 10, 2013 as received in Canadian Patent Application No. 2,698,961.

* cited by examiner

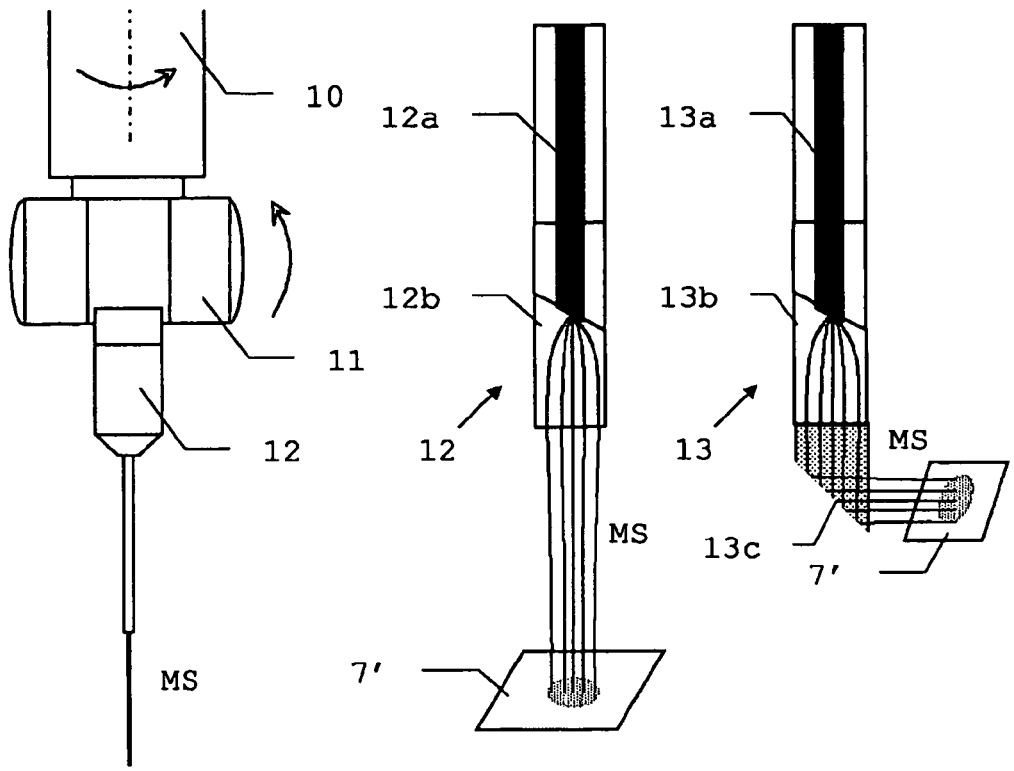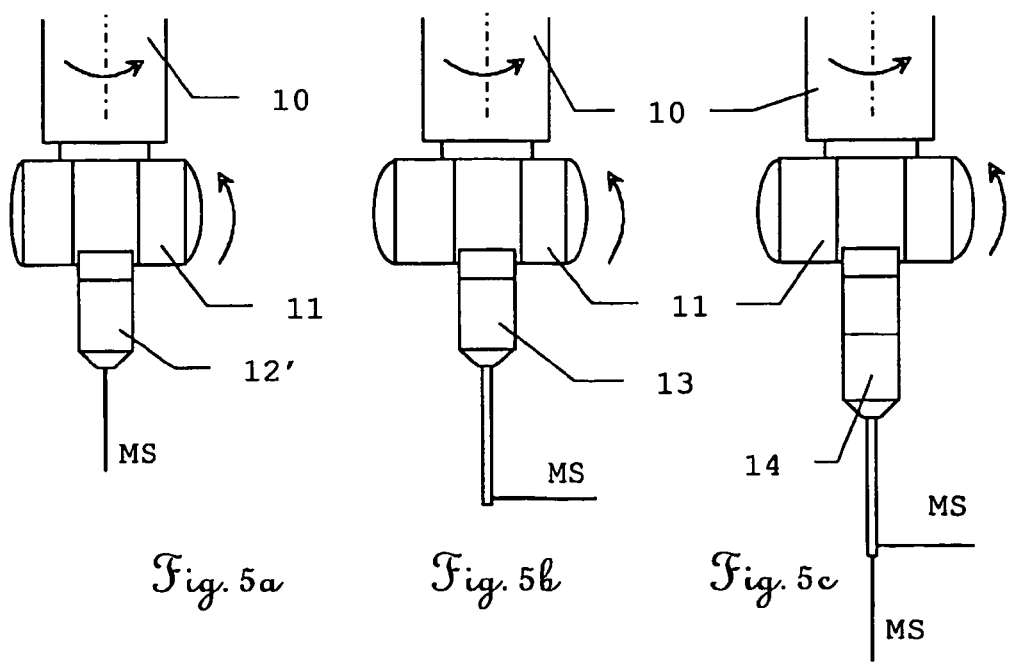
Fig. 3  Fig. 4a  Fig. 4b
Fig. 5a  Fig. 5b  Fig. 5c

METHOD AND MEASURING DEVICE FOR GAUGING SURFACES

The invention relates to a method for gauging surfaces and a measuring device for this purpose.

BACKGROUND

In many fields of use, there is a need to gauge surfaces of objects and hence also the objects themselves with high accuracy. This applies in particular to the manufacturing industry, for which the gauging and checking of surfaces of workpieces is very important.

For these applications, there is a number of existing measuring devices which are designed for specific tasks and are also designated as coordinate measuring devices or machines. These measuring devices gauge the surface by producing mechanical contact and probing the surface. Examples of this are gantry measuring machines, as described, for example, in DE 43 25 337 or DE 43 25 347. Another system is based on the use of an articulated arm whose measuring sensor arranged at the end of the multipart arm can be moved along the surface. Articulated arms of the generic type are described, for example, in U.S. Pat. No. 5,402,582 or EP 1 474 650.

In the prior art, a tactile probe which consists of a ruby sphere which is mounted on a measuring staff whose deflection is determined during probing via a switching element or distance-measuring element is used as a standard measuring sensor in such coordinate measuring devices. On the basis of the switching point or deflection distance, the point of contact is calculated. Although this approach is a mature solution for point measurements, this technical solution is suitable only for relatively slow measuring rates owing to the resultant frictional forces, probing forces and mechanical inertias. Moreover, impurities and abraded material on the sphere of the sensor and the object being measured lead to measuring errors. Precisely, for example, the internal measurement of drilled holes, however, requires precise and fast measurement in order to determine the waviness and roundness of the parts, particularly if these are to be carried out directly in the production line.

Approaches for non-contact gauging have therefore already been pursued in the prior art. The optical technologies used for this purpose in coordinate measuring machines are based firstly on cameras which determine dimensions of parts in reflected light or transmitted light, for example by means of the casting of shadows, with the aid of image recognition. Inner bores are however not characterizable in this manner; likewise, irregularities of surfaces are detectable only with the use of structured illumination.

Although triangulation-based systems permit very accurate distance determinations, the dimensions of the measuring head in the case of accuracies in the μm range and measured distances in the cm range are very large owing to the required base between the optical axes of transmitter and receiver. This also applies to confocal and chromatical confocal measuring principles which necessitate large dimensions of optical systems if a measuring range of a few cm is to be realized. Also problematic both in the case of triangulation and in the case of the confocal method is partial obscuration of the measuring or observation beam, which leads to large errors of measurement.

A further approach utilizes white light interferometry for high-precision gauging. Here, the application either employs scanning, i.e. by displacement of the interferometer, and therefore takes place slowly or, in the case of spectrally resolved detection, as a rule with limitation to a measuring range of a few mm.

A similar interferometric approach is disclosed, for example, in WO 92/19930, although in this case the recording of depth profiles of human tissue in the area of medical technology is of primary importance.

EP 1 744 119 discloses a system for gauging surfaces using optical coherence tomography and a frequency-modulated source. Here, a fibre ring laser is made tuneable by an acoustically tuneable filter element. The laser radiation is then used for interferometric gauging of surfaces in a common path interferometer, i.e. an interferometer which uses at least partly the same components or beam paths for measuring radiation and reference radiation. The reference distance here is provided by a reflection in the measuring arm of the interferometer. A reference interferometer is used for calibrating the wavelength. Although this setup is suitable in principle for fast, non-contact gauging of surfaces, it implicitly requires favourable geometrical conditions, as are present, for example, in the described gauging of cylindrical openings. This approach in this configuration is not suitable for the high-precision gauging of surfaces having arbitrary geometries and surface variations.

SUMMARY

An object is to provide an improved measuring method or measuring device for gauging surfaces or for determining surface topographies.

A further object is to provide a measuring method or measuring device which permits highly accurate and fast distance measurements with no dependence or only little dependence on form and structure of the surface to be measured.

These objects are achieved by the subjects of Claims 1 and 6, respectively or of the dependent claims, or the solutions are further developed.

The invention uses an interferometric measuring principle with frequency-modulated, i.e. tuneable laser source, the measurements therefore being effected in the frequency domain. Deviations from perpendicular incidence of the laser beam on the surface in the distance measurement are taken into account algorithmically according to the invention or with control during probing of the optical probe head as a measuring sensor, it also being possible to combine the two approaches. This approach is based on the discovery that, without such an algorithmic or control-based correction or adaptation to the surface variation, the desired accuracy is not achievable or is not achievable with the required probing rate, since an interaction with the surface which influences the measurement as a function of angle occurs as a result of the characteristic of the laser radiation.

For the intended field of use of the optical system in industrial coordinate measuring devices with free-beam measurements of a few cm using compact probe heads having diameters in the region of ruby spheres, the abovementioned interferometric method is used. In this frequency-modulated interferometry, a source which should as far as possible permit broadband tuning in a short time is used. Moreover, narrow-band characteristics with a coherence length of a few cm are required. The tuning of the source is referenced via a calibration interferometer whose length is known very precisely. In order as far as possible to eliminate environmental influences, such as, for example, temperature changes or vibrations originating from the measuring machine, in the measuring interferometer, the reference surface is as far as possible placed on a surface within the optical probe head or such a surface is used as the reference surface so that a so-called common path interferometer is realized. It is advantageous here if a sufficient quantity of light is input from this surface back into the monomodal fibre, whereas other optical transitions should as far as possible not feed back the signal into this fibre.

The laser source is preferably in the form of a fibre ring laser having an optical semiconductor amplifier as an amplifying medium and a tuneable filter element. The tuneable element may be formed, for example, as a Fabry-Perot filter or as an acoustically tuneable fibre Bragg grating. Further elements are optical couplers or insulators, the use and integration of which in such a system are known to the person skilled in the art.

If higher repetition rates are desired in the measurement, the fibre ring laser can be extended by a fibre length of several kilometers, the repetition rate corresponding to the inverse of the transit time of the light in the fibre ring. In this mode, those skilled in the art use the term Fourier domain mode-locked laser operation, described, for example, in R. Huber. et al., "Fourier Domain Mode Locking (FDML): A new laser operating regime and applications for optical coherence tomography", Optics Express, p. 3225 (2006).

As a further possibility for setting up the laser source, it is also possible to use an external cavity having a dispersive element, for example a grating or prism in combination with a moveable optical surface, e.g. a polygonal mirror, for fast tuning of the laser wavelength for the laser resonator.

However, the high-precision measurement to surfaces which is possible in principle with this arrangement is subject, owing to the position and form thereof, to influences which have to be taken into account if a fast and highly accurate measurement is to be realized. Rough target surfaces give rise to so-called speckles, i.e. position-dependent intensity variations, in coherent observation, which result from the wavelength-dependent geometrical conditions. In the case of the diffraction-limited configuration of the optical system for a fibre sensor, the focused laser spot on the target surface in the plane of the fibre practically corresponds to the Airy disc, i.e. the point spread function. In the case of a rough target surface, this remains true, the smallest size of a speckle being limited by the point spread function, but the position of the speckle in the plane of the fibre is undefined. This effect can lead to a substantial drop in intensity, the distance information in the case of perpendicular targets not being influenced thereby or being only slightly influenced.

If tilting of the target occurs, the interferogram shows a substantial variation in the amplitude, which can lead to complete extinction in a narrow wavelength range. These influences are dependent on the degree of tilting, i.e. the deviation of the angle of incidence of the measuring radiation from the normal to the surface or of the perpendicular from the tangent to the surface, and on the surface structure.

One possibility for taking into account these influences is algorithmically by an adapted evaluation. By introducing a threshold value, the evaluation of the phase information can be limited to amplitude values above the threshold value, since only this region contains reliable information about the average distance to the surface. As an alternative to the threshold value, however, it is also possible to effect an amplitude-weighted phase evaluation, resulting in a reduction in the uncertainty.

In this approach, however, the uncertainty of measurement is increased owing to the reduced quantity of data. However, this effect is stochastic and can be reduced by averaging of measurements. An incorrect phase evaluation on the basis of an unfavourable speckle position can on the other hand be eliminated systematically and hence not by averaging of individual measurements.

An alternative which avoids or at least reduces these influences is the control-based consideration of a resulting tilt of the target surface, in which the gauging process, i.e. the movement of the probe head, is appropriately adapted. Here, however, it is also possible to combine the two approaches, for example by orienting the probe head only within a certain angular range relative to the surface and additionally algorithmically adapting the recorded measured values, for example by the above-described use of a threshold value.

The control of the gauging movement can be effected on the basis of the recorded measured values themselves, i.e. without additional supporting rough measurement processes. For this purpose, the variation of the amplitude over the wavelength is analyzed, from which it is possible to draw conclusions about the reliability of the evaluation. In the case of a correspondingly nonuniform variation, this can be interpreted as an indication that the target surface must be tilted relative to the measuring beam. This information can be used directly for adjustment of the measuring device or its means for guiding the optical probe head relative to the object, until a uniform amplitude curve is observed and the systematic error in the measurement is negligible. In this way, the irregularity of the amplitude curve from the frequency-modulated interferometry over a large wavelength range is a controlled variable for the positioning of the optical probe head by the coordinate measuring device. The advantage of this approach is that no further additional measuring components are required.

If information describing the surface is present, as can be realized, for example, by modelling, for example as a CAD model, or preceding rough measurements, control can be effected directly on the basis of the known position of the probe head and the topography known at least roughly or in the required state.

For this purpose, the position of the object is first determined sufficiently accurately in the coordinate system of the coordinate measuring machine. This can be effected by gauging of measuring points or structures of the measured object which are known in three dimensions. On the basis of known CAD data or other model or rough measured data, the gauging can then be planned and carried out. This can be effected automatically by the machine, semiautomatically or manually by the operator. Here, the density of measuring points and measuring point position are established on the measured objects. Furthermore, the orientation of the measuring beam is established so that the measuring beam is oriented sufficiently orthogonally to the surface of the measured object during the measurements and, if necessary, the interfering influences of multiple reflections are also minimized. In a possible application, the difference between CAD data and measured object can then subsequently be determined in a comparison of required and actual values at the necessary points in a further step.

If, on the other hand, the object is not modelled and only very roughly gauged, the necessary coordinates of the measured object must be obtained from the data collected in the measuring process in order to orient the measuring beam sufficiently orthogonally to the surface of the measured object. Alternatively or in addition to the preceding approaches, the environment of the point or region to be gauged can be determined for this purpose by rough gauging in its spatial position and optionally in its variation in association with the actual gauging of the object. For this purpose, a higher error of measurement is consciously accepted since, instead of highly precise measured values, only estimates of the orientation of the surface, i.e. the direction of the normals to the surface, are required. In the subsequent accurate measurement, the respective actual orientation of the surface of the next measuring point can be derived from the rough measurement, and the beam path can be correspondingly oriented by movement of the means for guiding the probe head.

However, in a gauging process, after a few initial measurements, data relating to the last measuring points of the current measuring path are also available, from which the future course of the measuring path can be estimated. This is possible, for example, if maximum or minimum radii of curvature are known for the surface to be probed or the material or the intended use of a workpiece results from the outset in a certain variation of the surface, for example in the testing of the grinding of an optical lens or an astronomical mirror. During scanning, the future points can therefore be derived from the history of the last points measured, i.e. the future path can be extrapolated and hence the position-dependent change in the normals to the surface can be estimated. Accordingly, the coordinate measuring machine should be adjusted in order to achieve a movement of the probe head which is as parallel as possible to the surface tangent.

A further approach which can in principle also be combined with the above solutions is based on the use of rough measurements, which can also be carried out using other measuring principles or additional components. In addition to rough measurements also employing probing or scanning, in particular parallel or sequential measurements to three measuring points in the environment of the impingement point of the actual laser measuring beam can be effected.

Such measurements or three-point measurements can be effected, for example, via the following methods.
 Pneumatically. Pneumatic sensors likewise operate without contact and determine the distance from the pressure drop.
 By a tactile procedure, i.e. contacting, mechanical sensors.
 Laser triangulation.
 Confocal distance sensors.
 Laser transit time distance sensors.
 Capacitive distance sensors.
 Eddy current distance sensors.
 Inductive distance sensors.

Sensor types suitable for some of these solutions are available, for example, from Micro-Epsilon.

BRIEF DESCRIPTION OF THE DRAWINGS

A method according to the invention and a measuring device according to the invention for gauging surfaces are described or illustrated in more detail below, purely by way of example, with reference to working examples shown schematically in the drawing. Specifically.

FIG. 3 shows the diagram of a first embodiment of an optical probe head for a measuring device according to the invention;

FIGS. 4a-b show the schematic diagram of the beam path in the first and a further embodiment of the optical probe head for a measuring device according to the invention;

FIGS. 5a-h show the diagram of alternative embodiments of the optical probe head for a measuring device according to the invention;

DETAILED DESCRIPTION

Figure 1:
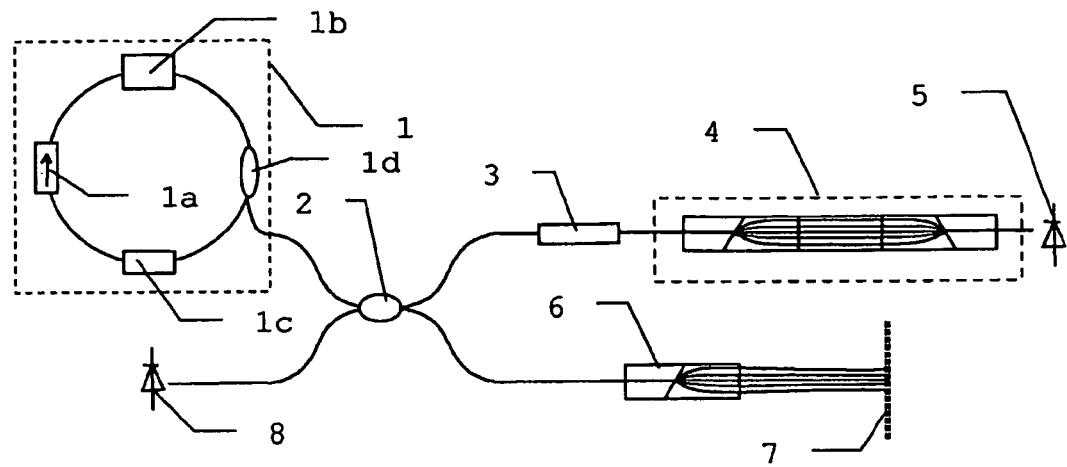
FIG. 1 shows the schematic diagram of the measuring arrangement of a measuring device according to the invention.

FIG. 1 shows the schematic diagram of the interferometric distance measuring arrangement of a measuring device according to the invention, comprising a frequency-modulated laser source 1 for generating at least one laser beam and a radiation detector 8 for receiving the measuring radiation scattered back by a surface 7. The frequency-modulated laser source 1 configured in fibre optics as a fibre ring laser comprises an optical insulator 1a, an optical semiconductor amplifier 1b and a tuneable filter element 1c, which may be, for example, in the form of a Fabry-Perot element. A first optical coupler 1d is used for output, which in turn is connected to a second optical coupler 2. The frequency-modulated laser source is preferably designed so that it has a coherence length of more than 1 mm, in particular in the range from 1 millimeter to 20 centimeters, for example possesses a central wavelength between 1.3 and 1.55 µm and a tuneable wavelength range of more than 40 nm in combination with a dynamic line width of less than 0.02 nm at a coherence length of 60 mm or more. The coherence length therefore also permits measurements over a depth or distance range of a few centimeters.

The laser radiation generated by the laser source is passed via the second optical coupler 2 into a calibration interferometer 4 having an optical detector 5, it being possible for this calibration interferometer 4 to be designed in particular in etalon or Mach-Zehnder configuration. This calibration interferometer 4 serves for taking into account or compensating nonlinearities in the tuning behaviour.

The second output of the second optical coupler 2 leads to the interferometer setup which is used for the measurement and is formed with common path geometry, i.e. as a partly common interferometer beam path for measuring and reference interferometer arm. The reference interferometer arm is defined here by a reflection at the optical exit surface of a gradient index lens 6, so that a constant, in particular known distance is determined, further back-reflections being avoided. Thus, the reference surface is within the beam forming optical system used for emitting the laser beam. The measuring interferometer arm is on the other hand defined by the reflection at the surface 7 to be gauged. The back-reflected light of measuring and reference interferometer arm is finally fed to the radiation detector 8, which is preferably in the form of an InGaAs detector having a bandwidth of more than 100 MHz.

Figure 2:
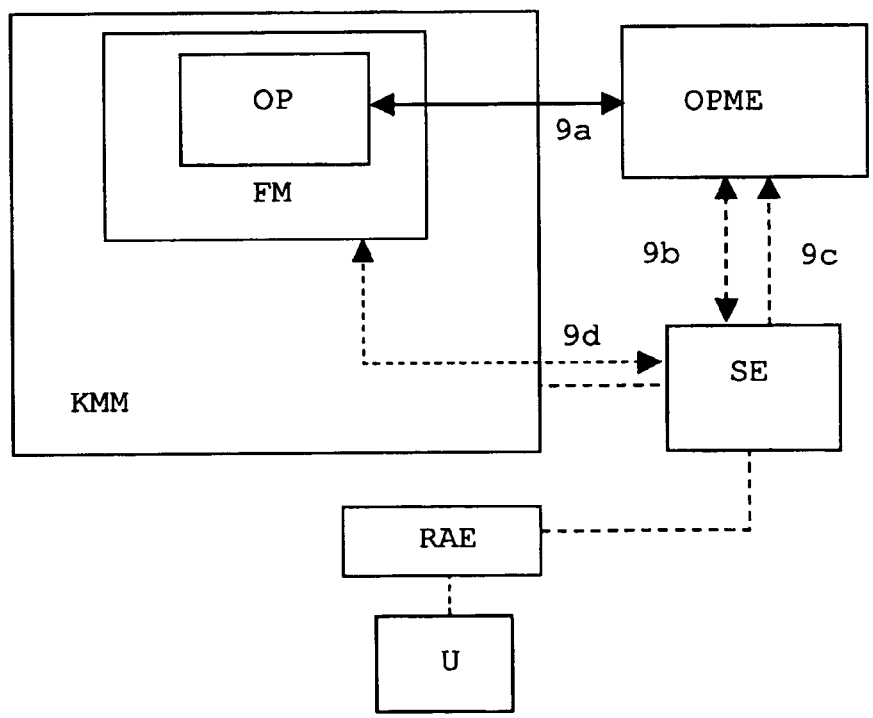
FIG. 2 shows the diagram of the main components for carrying out a method according to the invention, as a block diagram.

In FIG. 2, the main components for carrying out a method according to the invention are illustrated as a block diagram.

The signals picked up by the optical probe head OP are fed via a communication link 9a to the optical probe head measuring unit OPME, but, as an alternative, the radiation detector can also be arranged in the optical probe head measuring unit OPME so that, instead of the communication link 9a, an optical link, e.g. a fibre link, is used. The data of the optical probe head measuring unit (OPME) are in turn transmitted via a communication link 9b to the control unit SE of the coordinate measuring machine KMM. This control unit in turn transmits corresponding control instructions via the communication links 9b, 9c and 9d to the optical probe head measuring unit OPM, the coordinate measuring machine and in particular the guide means FM for defined guidance of the optical probe head OP in a probing procedure. A calculation and evaluation unit RAE serves for possible evaluation and communication with an operator U.

FIG. 3 shows the diagram of a first embodiment of an optical probe head 12 for a measuring device according to the invention. The probe head is guided by an arm element 10 and a joint 11 as guide means with probing in a defined manner over the surface to be gauged, rotation of the joint 11 relative to the arm element 10 also being possible. Owing to the rotatability relative to the arm element 10 and the subsequent joint 11, the probe head 12 can readily follow angled or greatly variable surface paths. In principle, however, even further rotational and translational degrees of freedom can be integrated into the guide means in order to permit further improved guidance of the probe head 12.

The probe head 12 has at least one emission and reception beam path of the measuring beam MS on the surface side. In this embodiment, the beam paths are guided by a thin tube, it being possible for the radiation detector itself or optical waveguides for transmission to a radiation detector integrated elsewhere to be arranged in the thicker part adjacent to this tube. The probe head 12 can be controlled by the guide means so that the condition of substantially perpendicular impingement of the laser beam on the surface is complied with, in particular a deviation of +/−5° to the normal to the surface is not exceeded. The probe head 12 can be moved so that it travels continuously with an orientation which is constant relative to the surface tangent, in particular with emission and reception beam path oriented perpendicularly to the surface tangent.

FIGS. 4a-4b show the schematic diagram of the beam path in the first and a second embodiment of the optical probe head for a measuring device according to the invention.

In FIG. 4a, the optical beam path for the first embodiment of the optical probe head 12 is illustrated. There, a fibre 12a serves for guiding the measuring radiation MS to be emitted as well as the measuring radiation MS which is reflected. The emission takes place here for a gradient index lens 12b which is arranged in the tubular part, emits the measuring radiation to the surface 7' to be gauged and inputs the measuring radiation MS reflected from there back into the fibre 12a.

In a similar manner, the beam path shown in FIG. 4b is realized for the embodiment of the optical probe head 13 which is shown at the bottom in FIG. 5b. Here, a fibre 13a and a gradient index lens 13b likewise serve for guiding the measuring radiation MS to be emitted as well as the measuring radiation MS which is reflected. The emission to the surface 7' is, however, effected here only after deflection by a deflecting element 13c which is arranged after the gradient index lens 13b and permits an emission direction perpendicular to the longitudinal axis of the tubular part of the probe head 13. As a result, drilled holes or other cylindrical openings or structures can be probed in a particularly advantageous manner.

Various embodiments of the optical probe head are shown as an overall view in FIGS. 5a-h, all variants being shown for simpler comparability with arm element 10 and joint 11 as guide means. According to the invention, however, other configurations of the guide means can also be used here, for example with a ball joint instead of the joint 11.

The variant 12' of the first embodiment, which is shown in FIG. 5a, dispenses with the thin tubular part, which is possible, for example, if predominantly flat surfaces and not bores or small structures have to be gauged.

FIG. 5b shows the variant of a probe head 13 with right-angled emission of the measuring radiation MS, which probe head has already been illustrated in FIG. 4b.

The probe head 14 shown in FIG. 5c is a combination of the variants of FIG. 3 and FIG. 5b. Here, the beam path of the measuring radiation is split into two channels, the emission and reception directions of which are oriented orthogonally to one another. Here, the measuring channels can be used in parallel or sequentially, either two measuring arrangements or a single measuring arrangement with separation of the two channels, for example by different polarization directions, being possible in the case of parallel use. Such a formation of the probe head permits, for example, gauging of edges or steps.

Figures 5D, 5E, 5F:
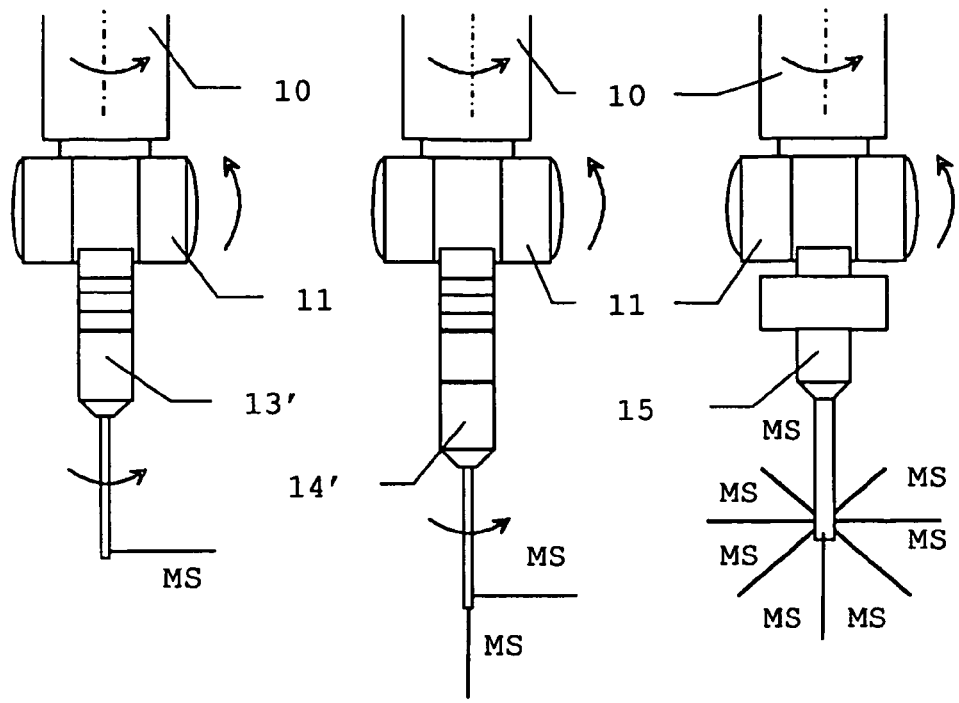

FIG. 5d and FIG. 5e show a modification of the embodiments of FIG. 5b and FIG. 5c, in which the tubular part of the probe head 13', 14' is formed so as to be rotatable in its longitudinal axis and hence relative to the joint 11. Consequently, a circular scanning movement can be performed with the measuring beam MS. A further alternative here is a cross scanning movement, which is not shown. Such scanning movements can be used in particular for fast rough measurement and hence for estimating the position of the normal to the surface in that region of the surface which is to be gauged.

Figures 5G, 5H:
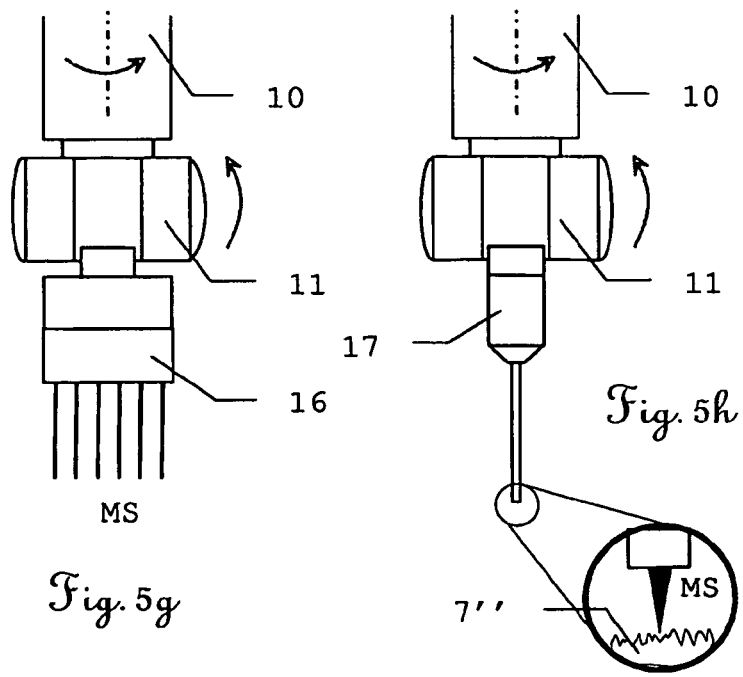

FIG. 5f and FIG. 5g show probe heads 15, 16 with multi-channel beam guidance, here too it being possible to realize parallel or sequentially switching emission. These embodiments permit highly precise gauging of openings or surfaces without large changes in the position of the probe head 15, 16 or, in the case of reduced accuracy of the measurement, rough measurement to many points in the environment for estimation purposes.

FIG. 5h shows the embodiment of a probe head 17 for local fine measurement. Here, the measuring radiation is not emitted with collimation but is focused nearby for resolution of a finely structured surface 7".

Figure 6A:
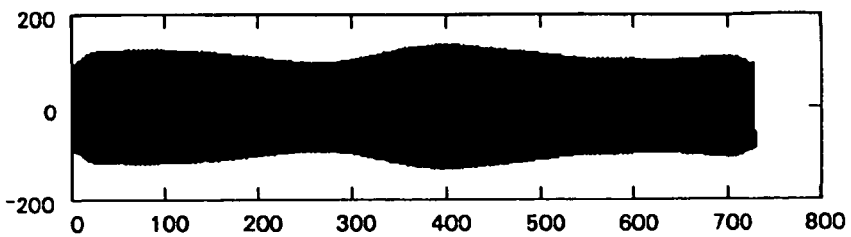
FIGS. 6a-b show the diagram of measuring interferogram, phase variation and amplitude variation for an untilted rough target.
Figure 6B:
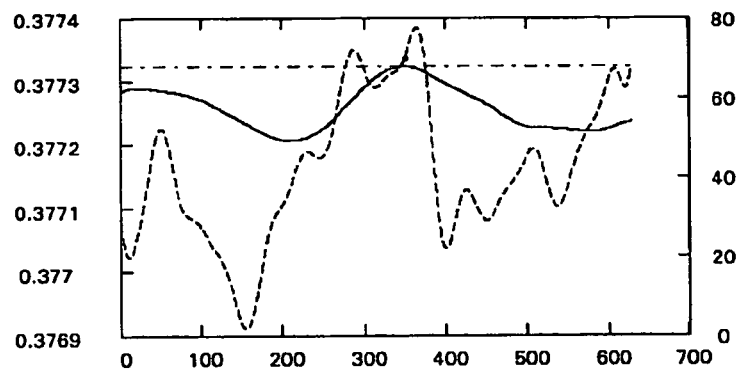

FIGS. 6a-b show the diagram of measuring interferogram, phase variation and amplitude variation for an untilted rough aluminium surface. FIG. 6a shows a measured interferogram over a wavelength range of 50 nm. In this wavelength range, the envelope shows only very slight variation. FIG. 6b shows the phase and amplitude variation for the above interferogram, the phase being represented by a dashed line and the amplitude by a solid line.

Figure 7A:
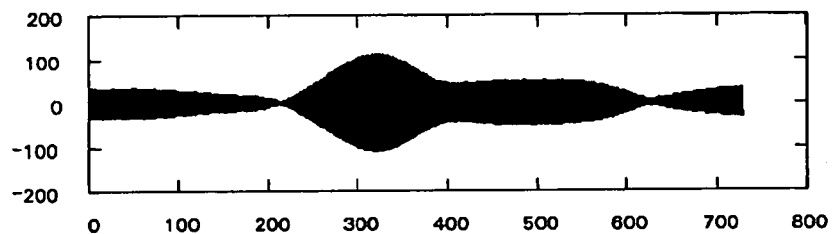
FIGS. 7a-b show the diagram of measuring interferogram, phase variation and amplitude variation for a tilted rough target and the approach using a threshold value criterion as a first embodiment of the method according to the invention.
Figure 7B:
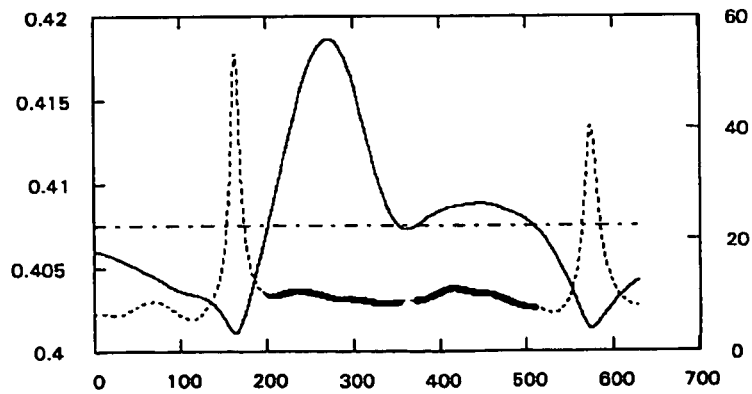

FIGS. 7a-b show the corresponding diagrams of measured interferogram, phase variation and amplitude variation for the same surface which, however, is tilted relative to the direction of incidence of the measuring beam. In FIG. 7a, the phase information is very undefined, including strong "outliers", in the constriction regions. At this point, destructive speckle interference is present in the fibre core region and the constructively interfering part is laterally shifted, but, owing to the wavelength dependence, said interference is present only in a relatively small spectral range of a few nm. If the situation is considered in the plane of the fibre, the one speckle migrates around the fibre core as a function of wavelength. If the speckle comes to rest directly on the fibre core, this corresponds to correct focusing of the laser spot on the surface, which, in the measurement, permits a uniform weighting of the distance information over the skew surface, i.e. the mean value can be accurately determined in this situation. In the case of a shifted speckle, this is no longer possible since the shift in the plane of the fibre also corresponds to an "apparent" shift in the surface to be gauged, i.e. in this case the average distance information deviates from the actual midpoint of the laser spot. In this way, there is a relationship between amplitude and accurate mid-point determination of the laser spot.

In an adapted algorithmic evaluation as a first embodiment of the method according to the invention, owing to the threshold value, only phase information which belongs to amplitude values above the threshold value are evaluated, which is illustrated in FIG. 7b by the bold region of the dashed line, which represents the phase. Another possibility is amplitude weighting of the phase values in distance measurement for calculating the phase information.

Figure 8:
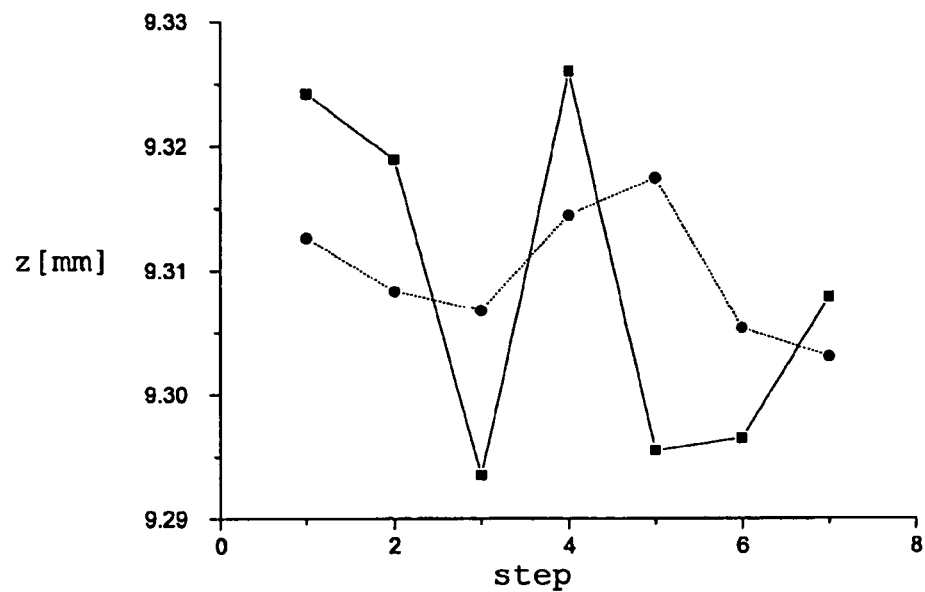
FIG. 8 shows the schematic diagram of the effect of the first embodiment of the method according to the invention for the tilted rough target.

FIG. 8 shows the corresponding effect of the first embodiment of the method according to the invention for the tilted rough aluminium surface shown in FIGS. 7a-b. The measured distance in mm is plotted with a lateral shift of the target in discrete steps, without changing the geometrical distance thereby. The solid line corresponds to the measured distances without threshold value criterion and the dashed line corresponds to the measurements with threshold value criterion. As is clearly evident, the variation of the measured values decreases by the use of a threshold criterion in the evaluation.

Figure 9:
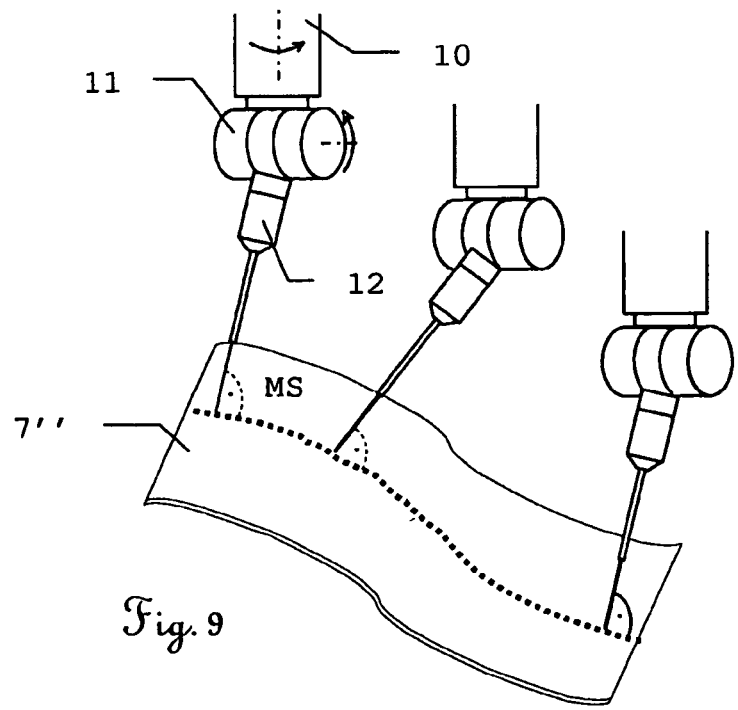
FIG. 9 shows the schematic diagram of a second embodiment of the method according to the invention and FIG. 10 shows the diagram of an embodiment of a probe head with parallel rough measurements for a measuring device according to the invention.

FIG. 9 illustrates a second embodiment of the method according to the invention, comprising generation of a frequency-modulated laser beam, emission of the laser beam as measuring radiation MS to the surface 7'', reception of the measuring radiation MS scattered back from the surface 7'' and interferometric distance measurement from a reference point to the surface 7''. Here, the laser radiation is emitted and received during gauging via the surface 7'' to be gauged, deviations from perpendicular impingement of the laser beam on the surface during gauging by the probe head 12 along the measuring path shown by a dashed line being taken into account by a control procedure by affecting the control in such a way that the condition of substantially perpendicular impingement of the laser beam on the surface 7'' is complied with, in particular a deviation of +/-5° to the normal to the surface is not exceeded. By this control procedure, it is ensured that the angle of incidence of the measuring radiation always remains within a narrow tolerance range around the perpendicular to the surface 7'' or its normal to the surface or evaluatable measurements are only carried out when this condition is fulfilled.

The control of the probe head 12 by joint 11 and arm element 10 as guide means can be effected on the basis of the wavelength-dependent variation of the amplitude of the received measuring radiation MS as a control variable for the emission. Here, a variation in the angle of impingement of the laser beam may take place, which occurs until a substantially wavelength-independent curve of the amplitude is achieved. Alternatively or in addition, the control can be effected with the use of information about the topography of the surface 7'', in particular with the use of a model for the surface 7'', the model preferably being computer-generated or being prepared by preceding rough gauging. The data from the model or from the rough gauging of the object to be measured are used for positioning the probe head 12 so that the measuring radiation MS is oriented along the normal to the surface. The control can also be effected with the use of extrapolation of preceding distance measurements, in particular taking into account predetermined maximum and/or minimum radii of curvature of the surface 7'''.

Figure 10:
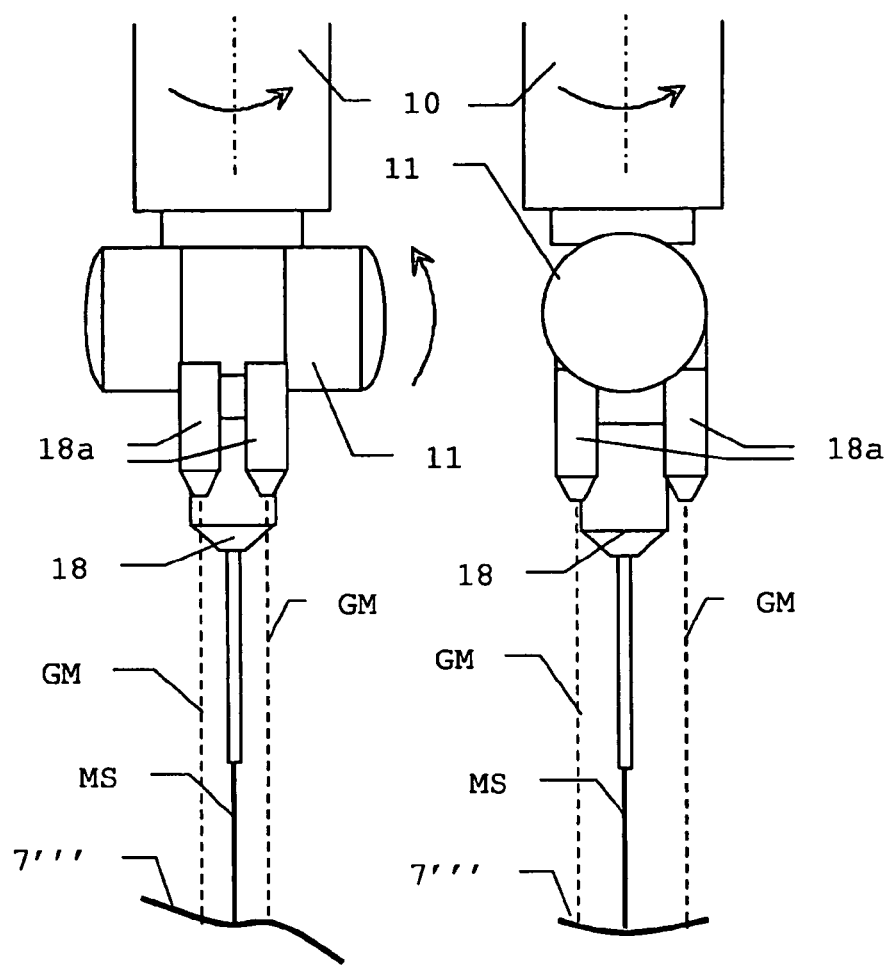

A further possibility is the recording of supporting rough measurements for determining the variation of the surface 7''', as is possible, for example, with the embodiment of a probe head 18 with parallel rough measurements, shown in FIG. 10.

The probe head 18 corresponds substantially to the variant in FIG. 3 but now has additional measuring elements 18a which are oriented with their rough measuring axis GM parallel to the emission axis of the measuring radiation MS and are likewise arranged so as to be pivotable at the joint 11. These measuring elements 18a can therefore be moved in the same manner with the emission axis of the measuring radiation MS. Different numbers of measuring elements 18a can be chosen, the probe head 18 having in principle at least one component for local rough measurement. In this working example, three measuring elements 18a are arranged around the body of the probe element so that a parallel three-point measurement can take place. This permits control with the use of local rough measurements in the vicinity of the impingement point of the measuring radiation MS on the surface 7'''.

Here, the measuring elements 18a may use a multiplicity of measuring principles; in particular, these may be designed acoustically, in particular by means of ultrasound, optically, in particular by means of triangulation, phase or transit time measuring principle, mechanically contracting, in particular by deflection of a distance sensor, inductively, capacitively or pneumatically. Corresponding components for local rough measurement may therefore have, for example, one of the following sensors
  pneumatic sensor,
  ultrasonic sensor,
  tactile sensor,
  laser triangulation sensor,
  confocal distance sensor,
  laser transit time distance sensor,
  laser phase measurement distance sensor,
  capacitive distance sensor,
  eddy current distance sensor
  inductive distance sensor.

In addition to the embodiments shown in FIG. 10, it is also possible, according to the invention, to use further or different arrangements of sensors for rough measurement. Thus, for example, independent moveability can also be realized, so that a rough measurement for recording the surface topography is effected in parallel with the high-precision measuring process, independently and elsewhere. In particular, this rough measurement may also be based on methods other than gauging or point measurement methods, as are known, for example, from stereophotogrammetry.

The working examples shown in the figures serve by way of illustration. In particular, the embodiments of the probe heads are shown purely schematically. Arrangements may depend on the actual circumstances. Moreover, the guide means may differ substantially from the means shown, depending on the intended use or type of measuring machine.

We claim:
1. A method for gauging surfaces using a coordinate measuring machine (CMM), comprising:
   generating a frequency-modulated laser beam having a coherence length of more than 1 millimeter;
   emitting the laser beam as measuring radiation to the surface,
   receiving the measuring radiation scattered back from the surface; and
   measuring interferometric distance from a reference point to the surface with the use of a measuring and a reference interferometer arm, the measuring radiation being emitted and received during guiding an optical probe head by a guide element and a joint connected to the probe head as guide means of the coordinate measuring machine in a defined manner over the surface to be gauged, and, in the interferometric distance measurement, the measuring and reference interferometer arms having a partly common beam path, wherein deviations from the substantially perpendicular impingement of the measuring radiation on the surface are avoided or reduced during guiding the probe head over the surface by controlling the direction of emission of the measuring radiation, wherein the control:
is effected on the basis of the wavelength-dependent variation of the amplitude of the received measuring radiation as a control variable for the direction of emission; or
is effected on the basis of the wavelength-dependent variation of the amplitude of the received measuring radiation as a control variable for the direction of emission by variation of the impingement of the measuring radiation until the occurrence of a substantially wavelength-independent amplitude curve,
wherein, for setting up a laser source that emits the laser beam, an external cavity having a wavelength selective element is used for fast tuning of the laser wavelength for a laser resonator of the laser source,
and wherein:
the joint is rotatable relative to the arm element; and
the surface being gauged is the surfaces of an industrial workpiece.

2. A method according to claim 1, wherein the coherence length is more than 60 millimeters.

3. A method according to claim 1, the measuring and reference interferometer arm having the partly common beam path with a reference surface defining the reference interferometer arm and present within the beam forming optical system used for emitting the laser beam.

4. A method according to claim 1, wherein, in the distance measurement, only amplitude values in the interferogram for the back-scattered measuring radiation which are above a threshold value are taken into account for calculating the phase information.

5. A method according to claim 1, wherein, in the distance measurement, an amplitude weighting of the phase values is effected for calculating the phase information.

6. A method according to claim 1, wherein, during the probing, control of the emission is effected in such a way that the condition of substantially perpendicular impingement of the measuring radiation on the surface is complied with in the distance measurement and a deviation of +/−5° to the normal to the surface is not exceeded.

7. A method according to claim 1, wherein, during the probing, control of the emission is effected in such a way that the condition of substantially perpendicular impingement of the measuring radiation on the surface is complied with in the distance measurement.

8. A method according to claim 7, wherein the control:
is effected with the use of information about the topography of the surface; and/or
is effected with the use of local rough measurements in the vicinity of the impingement point of the measuring radiation, at least one of the following measuring principles for rough measurements or rough probing being used:
acoustic;
optical;
mechanically contacting;
inductive;
capacitive;
pneumatic; and/or
is effected with the use of an extrapolation of preceding distance measurements.

9. A method according to claim 7, wherein the control:
is effected with the use of information about the topography of the surface, in particular with the use of a model of the surface, the model being computer-generated or being prepared by preceding rough probing; and/or
is effected with the use of local rough measurements in the vicinity of the impingement point of the measuring radiation by parallel sequential rough measurements to three measuring points, at least one of the following measuring principles for rough measurements or rough probing being used:
acoustic by means of ultrasound;
optical by means of triangulation, phase or transit time measuring principle;
mechanically contacting by deflection of a distance sensor;
inductive;
capacitive;
pneumatic; and/or
is effected with the use of an extrapolation of preceding distance measurements taking into account predetermined maximum and/or minimum radii of curvature of the surface.

10. A coordinate measuring machine (CMM) for gauging surfaces of industrial workpieces, comprising:
a guide element and a joint as guide means connected to an optical probe head, for guiding the probe head in a defined manner over the surface to be gauged; and
an interferometric distance measuring arrangement having:
a frequency-modulated laser source for generating at least one laser beam as measuring radiation;
a radiation detector for receiving the measuring radiation scattered back from the surface;
a measuring interferometer arm; and
a reference interferometer arm, the probe head having at least one emission and reception beam path for emission of the measuring radiation, and the measuring and reference interferometer arm having a partly common beam path, wherein the guide means are controlled in such a way that the condition of substantially perpendicular impingement of the measuring radiation on the surface is complied with, wherein the direction of emission of the measuring radiation is controlled on the basis of the wavelength-dependent variation of the amplitude of the received measuring radiation as a control variable for the direction of emission; or on the basis of the wavelength-dependent variation of the amplitude of the received measuring radiation as a control for the direction of emission by variation of the impingement of the measuring radiation until the occurrence of a substantially wavelength-independent amplitude curve,
wherein, for setting up a laser source that emits the laser beam, an external cavity having a wavelength selective element is used for fast tuning of the laser wavelength for a laser resonator of the laser source,
and wherein:
the joint is rotatable relative to the arm element; and
the surface being gauged is the surfaces of an industrial workpiece.

11. A coordinate measuring machine according to claim 10, the reference interferometer arm having the partly common beam path with a reference surface defining the reference interferometer arm and present within the beam forming optical system used for emitting the laser beam.

12. A coordinate measuring machine according to claim 10, wherein the guide means are controlled in such a way that the condition of substantially perpendicular impingement of the measuring radiation on the surface is complied with and a deviation of +/−5° to the normal to the surface is not exceeded.

13. A coordinate measuring machine according to claim 10, wherein the reference interferometer arm is defined by a reflection at the optical exit surface of a gradient index lens of the beam forming optical system.

14. A coordinate measuring machine according to claim 10, wherein:
the probe head is formed by a plurality of parallel and/or switchable beam paths in a multichannel manner; and/or
the probe head is formed for carrying out a cross or circular scanning movement of the measuring radiation.

15. A coordinate measuring machine according to claim 10, wherein the probe head has at least one component for local rough measurement in the vicinity of the impingement point of the measuring radiation comprising at least one of the following sensors
pneumatic sensor;
tactile sensor;
ultrasonic sensor;
laser triangulation sensor;
confocal distance sensor;
laser transit time distance sensor;
laser phase measurement distance sensor;
capacitive distance sensor;
eddy current distance sensor; or
inductive distance sensor.

16. A coordinate measuring machine according to claim 10, wherein the probe head has at least one component for local rough measurement in the vicinity of the impingement point of the measuring radiation.

17. A coordinate measuring machine according to claim 10, wherein the interferometric distance measurement arrangement has a calibration interferometer.

18. A coordinate measuring machine according to claim 10, wherein the interferometric distance measurement arrangement has a calibration interferometer in etalon or Mach-Zehnder configuration.

19. A coordinate measuring machine according to claim 10, wherein the frequency-modulated laser source has a central wavelength between 1.3 and 1.55 µm.

20. A coordinate measuring machine according to claim 10, wherein the frequency-modulated laser source has a tuneable wavelength range of more than 40 nm and a dynamic line width of less than 0.04 nm.

21. A coordinate measuring machine according to claim 10, wherein the frequency-modulated laser source is in the form of a fibre ring laser having an optical semiconductor amplifier element.

22. A coordinate measuring machine according to claim 10, wherein the frequency-modulated laser source has a Fabry-Perot filter, an acoustically modulatable fibre Bragg grating or a polygonal mirror in combination with a dispersive element.

23. A coordinate measuring machine according to claim 10, wherein the radiation detector is an InGaAs detector having a bandwidth of more than 100 MHz.

24. A method according to claim 1, wherein the
measuring radiation is emitted into a direction perpendicular to an axis of rotation of the joint relative to the guide element.

* * * * *